Figure 1:
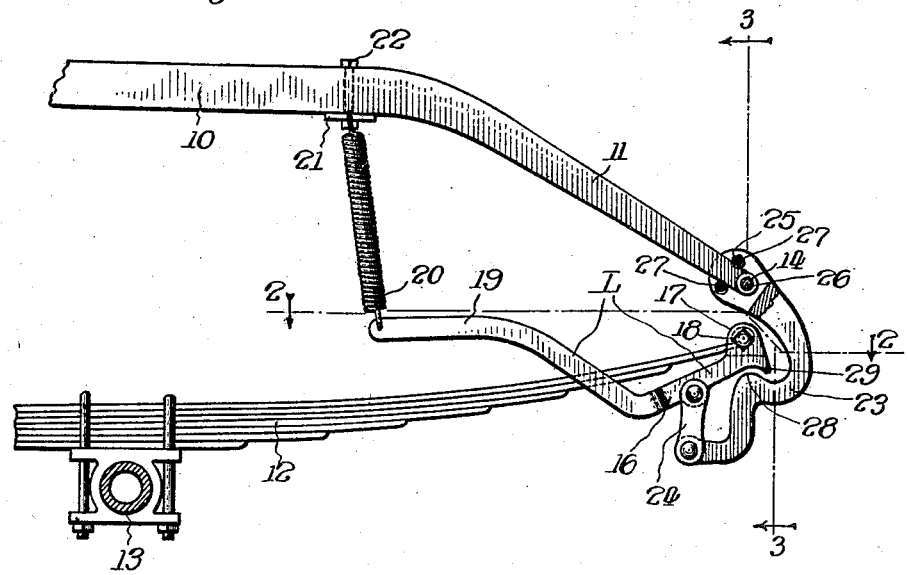

J. M. KERR.
SHOCK ABSORBER.
APPLICATION FILED JULY 14, 1921.

1,417,176. Patented May 23, 1922.

Witness:
T. J. Sauser

Inventor:
James M. Kerr,
By Charles J. Schmidt
Atty.

UNITED STATES PATENT OFFICE.

JAMES M. KERR, OF CRAWFORDSVILLE, INDIANA.

SHOCK ABSORBER.

1,417,176.  Specification of Letters Patent.  Patented May 23, 1922.

Application filed July 14, 1921. Serial No. 484,642.

*To all whom it may concern:*

Be it known that I, JAMES M. KERR, a citizen of the United States, and a resident of Crawfordsville, in the county of Montgomery, State of Indiana, have invented certain new and useful Improvements in Shock Absorbers, of which the following is a specification.

My invention relates to shock absorber mechanism which is particularly useful and efficient on automotive vehicles of the side spring type. The important object of the invention is to provide a simple and inexpensive shock absorbing attachment which will efficiently take up and absorb the lesser and short vibration shocks during travel of the vehicle and which will efficiently smooth and pave the way for the operation of the vehicle springs to take up the heavier shocks. Another object of the invention is to provide such construction and arrangement that the recoil or rebound of the vehicle springs will be efficiently braked, snubbed and absorbed. A further object of the invention is to provide construction and arrangement which will permit attachment of the shock absorbing mechanism without interfering with the normal relative position of vehicle springs and without requiring rearrangement or reconstruction of such springs or vehicle parts.

On the accompanying sheet of drawing the construction, application and operation of my improved shock absorbing mechanism is clearly illustrated. On the drawing—

Figure 3:
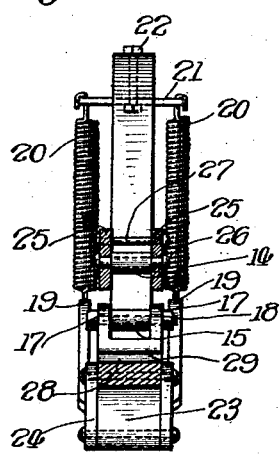
Figure 2:
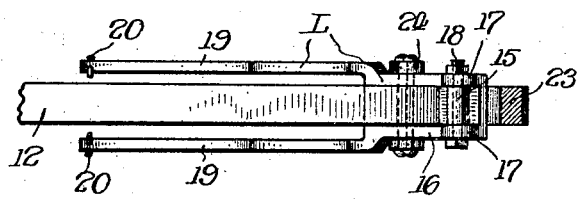

Fig. 1 is a side elevational view of one corner of a vehicle showing the shock absorbing mechanism applied to the vehicle springs, Fig. 2 is a plan view on plane 2—2, Fig. 1, Fig. 3 is a sectional view on plane 3—3, Fig. 1.

On the drawing 10 represents one of the side beams of a vehicle chassis which has the diagonally downwardly inclined end 11. Parallel with and below the side beams is the vehicle spring 12 secured in any suitable manner to the axle 13, the inner end of this spring being secured either directly or in a round about way to the vehicle body or frame. At its outer end the spring 12 terminates below the end of the extension 11. The end 11 terminates in the eye 14 and the spring terminates in the eye 15, the spring being normally connected with the end 11 by a shackle member which member is, however, removed for the purpose of application of my shock absorber attachment. Forming part of the shock absorber mechanism is the lever member designated as a whole by L. It comprises a body part 16 which is disposed below the end of the spring 12 and has the ears 17 at its outer end for receiving between them the eye 15 of the spring, a bolt 18 extending through the ears and eye to pivot or fulcrum the lever on the spring. Extending upwardly and inwardly from the inner end of the body 16 are the arms 19 which receive between them the spring 12 and which at their inner ends are connected by shock absorbing springs 20 with the vehicle body or frame. As shown, they hook from a plate 21 fastened on the side beam 10 by bolts 22.

The shock absorber attachment comprises also a fitting 23 which is secured to the end 11 and which extends downwardly and inwardly to terminate a distance below the body 16 of the lever and a short distance inside of the lever fulcrum point, the link 24 connecting the inner end of the fitting with the body of the lever as clearly shown in Fig. 1. This link may be the shackle member which was taken from the vehicle before application of the shock absorber attachment, and which normally connects together the spring 12 and the end 11 of the frame. The lever member and the fittings may be constructed of steel or may be in the form of castings. The fitting 23 has the ears 25 at its upper end for receiving between them the eye 14 on the frame extension 11, a bolt 26 extending through the ears and eye. Through the ears at each side of the extension 11 a pin 27 is driven, these pins abutting against the extension 11 and co-operating with the bolt 26 to rigidly hold the fitting on the extension 11. The fitting can thus be quickly and easily applied on the vehicle chassis frame.

The fitting 23 is deflected to provide an abutment hump 28 below the fulcrum end of the lever and the lever has the abutment heel or lug 29 outside of the vertical line of its fulcrum point. During normal operation of the vehicle, the lever and hump 28 will not touch and the hump and abutment heel will be out of vertical register, the heel being outside of the hump. However, during abnormal separation of the vehicle spring and chassis, the hump and heel will come into vertical register and will engage to cause swing of the lever L.

Describing now the operation, as a vehicle travels over a roadway, the lesser irregularities and shocks are practically all taken up by the shock absorber attachment, the vehicle body and load being suspended from the shock absorber lever by the link 24, and as the wheels travel over bumps the lever L swings downwardly against the resistance of the shock absorbing springs 20. As the suspension link 24 is comparatively close to the fulcrum point of the levers, considerable leverage and advantage is afforded the springs 20 and these springs can therefore be comparatively light and very responsive. The larger bumps and heavier shocks are, of course, first received by the shock absorbing attachment, and are eventually taken up by the vehicle springs. The shock absorbing attachment paves the way and gradually and smoothly transmits such heavier shocks to the vehicle springs for final absorption. Thus, the more annoying choppy bumps or vibrations are practically all absorbed by the shock absorber attachment and the heavier shocks are toned down to a considerable extent by the shock absorber attachment before the vehicle springs receive them.

When the vehicle wheels encounter a steep elevation the vehicle springs, after being heavily compressed, will tend to throw the body violently upwardly. Also, if the wheels suddenly encounter a deep depression the springs will tend to throw the body upwardly when they recoil. However, my improved shock absorbing attachment is designed to brake, snub and absorb such recoil and rebound movement. During ordinary travel of the vehicle the lever will not engage with the fitting 23 and the hump 28 will be offset inwardly from the vertical line of the abutment heel 29. However, when the vehicle body tends to rebound upwardly, the vehicle spring will relax and the fulcrum point of the lever L will shift inwardly a sufficient distance to bring the abutment heel 29 into vertical register with the hump 28, and engagement of the hump with the heel will cause the lever L to swing downwardly against the resistance of the shock absorbing springs 20 and the recoil of the frame will therefore be braked and snubbed by the shock absorbing attachment. Thus the shock absorbing mechanism is in constant operation to head off and absorb all the shocks which would otherwise be abruptly transmitted to the vehicle body and the result is smooth and easy riding of the vehicle.

The shock absorber mechanism is extremely simple and can be readily and quickly applied to a vehicle without requiring any alterations thereon or additions thereto. The lever L may have one or more arms. Preferably, two arms are provided, one at each side with a spring for each arm, this arrangement providing a balanced structure.

Having described my invention, I claim the following:

1. In a vehicle, the combination of the vehicle axle, a spring secured thereto, the vehicle frame above the spring having an extension deflecting downwardly and terminating above the end of the spring, a lever fulcrumed at its outer end directly on the end of the vehicle spring and extending inwardly, an elastic connection between the inner end of said lever and the vehicle frame, a fitting secured to the end of the frame extension and extending downwardly and terminating below said lever near its fulcrum point, and a link connecting between the inner end of said extension and said lever.

2. In a vehicle, the combination of the vehicle axle, a semi-elliptic spring secured on said axle, the vehicle side frame over said spring having a rigid extension terminating above the end of said vehicle spring, a lever fulcrumed at its outer end directly on the end of the vehicle spring, the body of said lever being below said spring and the inner end thereof extending past and above said spring, an elastic connection between the inner end of said lever and said frame, a fitting secured on the ends of said rigid extension and terminating below said lever, and a link connecting between said fitting and said lever near the fulcrum end thereof.

3. In a vehicle, the combination of the axle, a spring secured on said axle at right angles thereto, the vehicle frame above the spring, an extension on said frame extending around and below the end of said spring, a lever fulcrumed at its outer end directly on the end of said spring and extending inwardly, a link connecting said extension with said lever near its fulcrum point, and an elastic connection between the inner end of said lever and said frame.

4. In a vehicle, the combination with the axle, of a spring secured thereto at right angles therewith, the vehicle frame above the spring, a fitting secured on said frame and extending around and below the end of said spring, a lever fulcrumed at its outer end on the end of said spring and extending inwardly, a link connecting the inner end of said fitting with said spring near its fulcrum end, an elastic connection between the inner end of said lever and said frame, an abutment hump on said fitting, and an abutment projection on said lever, said hump and projection being out of vertical register during normal operation of the vehicle but being brought into register during abnormal separation of the spring and frame and engaging during such abnormal separation to effect swing of the lever against the resistance of the elastic connection.

5. In a vehicle, the combination of the axle, a semi-elliptic spring secured on said axle at right angles thereto, the vehicle frame, a rigid extension on said frame terminating above the end of said spring, a lever fulcrumed at its outer end on the end of said spring, the outer section of said lever being below said spring and the inner end thereof extending past and above said spring, an elastic connection between the inner end of said lever and said frame, a fitting secured on said frame extension and extending around the fulcrum end of said lever, a link connecting the inner end of said fitting with said lever near its fulcrum point, said fitting having a hump below the fulcrum end of the lever and said lever having an abutment point, said hump and point being out of vertical registration during normal operation of the vehicle but being brought into vertical registration during abnormal separation of the spring and frame when said hump and projection may engage to cause swing of said lever against the resistance of the elastic connection.

6. In a vehicle, the combination of the axle, a leaf spring secured to the axle at right angles thereto and extending outwardly therefrom, the vehicle side frame above the spring, a rigid extension on said frame terminating a short distance above the end of said vehicle spring, a lever fulcrumed at its outer end on the end of said vehicle spring and extending below and then past and above said spring, an elastic connection between the inner end of said lever and said frame, a fitting detachably secured on said frame extension and extending around the end of said spring and below the fulcrum end of the lever, a link connecting the inner end of said fitting with said lever near its fulcrum end, separation of said spring and frame under normal operation of the vehicle causing rocking of said lever and resistance of said elastic connection, said fitting having an abutment hump, and an abutment point on said lever outside of its fulcrum point, said hump and point being out of engagement and out of vertical register during normal operation of the vehicle but being brought into vertical register during abnormal separation of said spring and frame and then into engagement to effect swing of said lever against the resistance of said elastic connection.

In witness whereof, I hereunto subscribe my name this 9 day of July A. D., 1921.

JAMES M. KERR.